Oct. 14, 1958  G. H. ALLEN  2,855,720
BAIT CONTAINER
Filed May 2, 1955  2 Sheets-Sheet 1
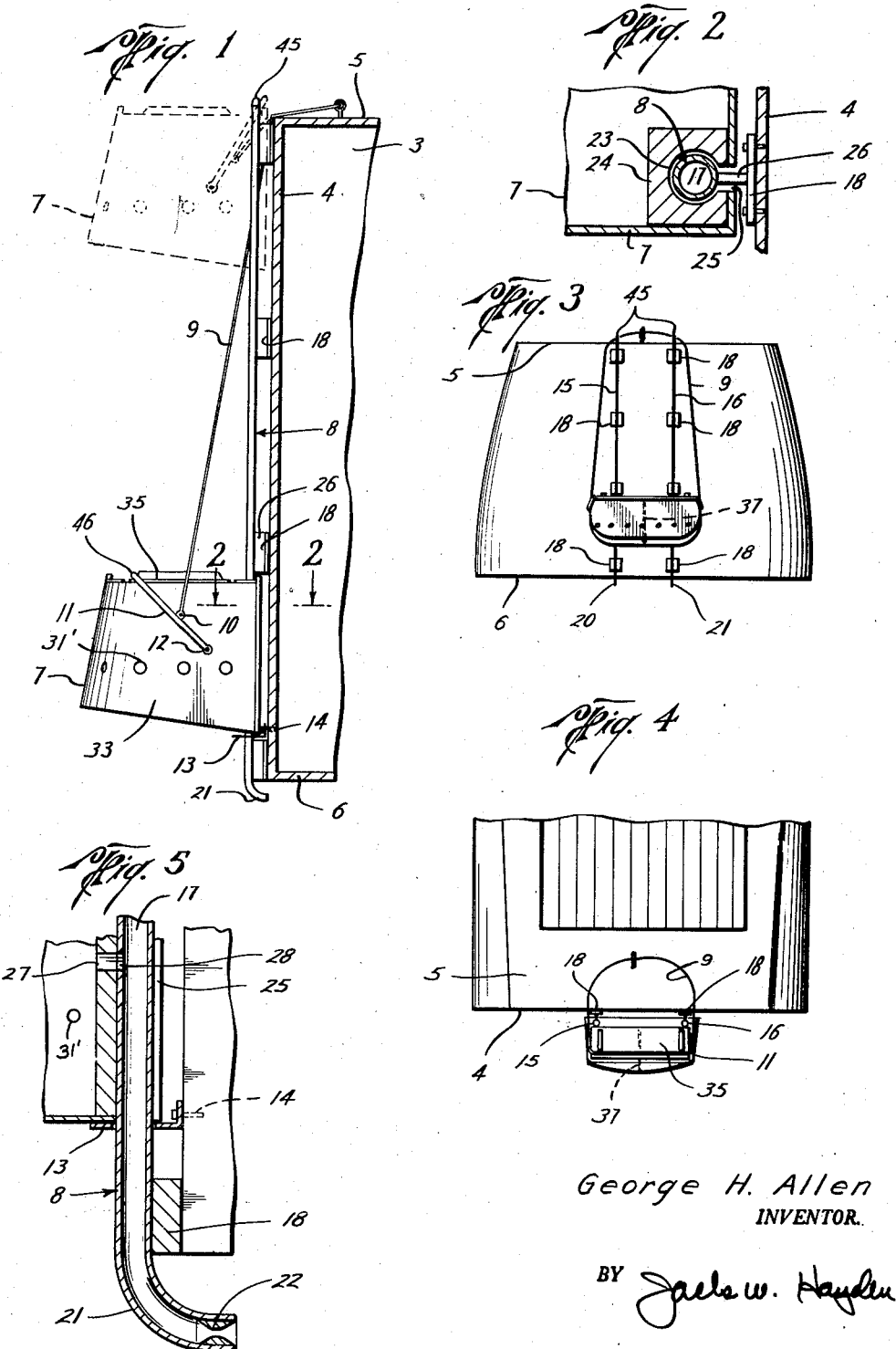
George H. Allen
INVENTOR.
BY Jacks W. Hayden
ATTORNEY

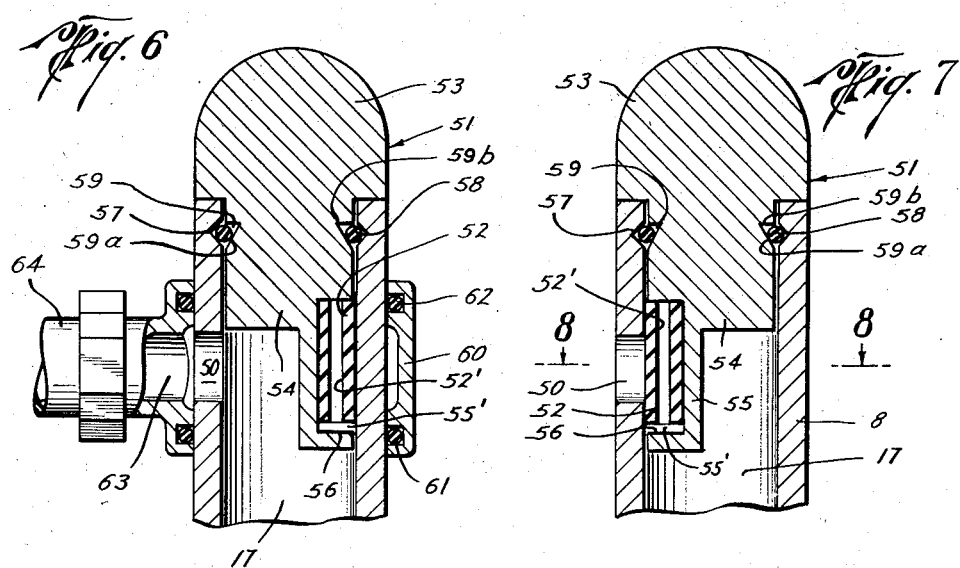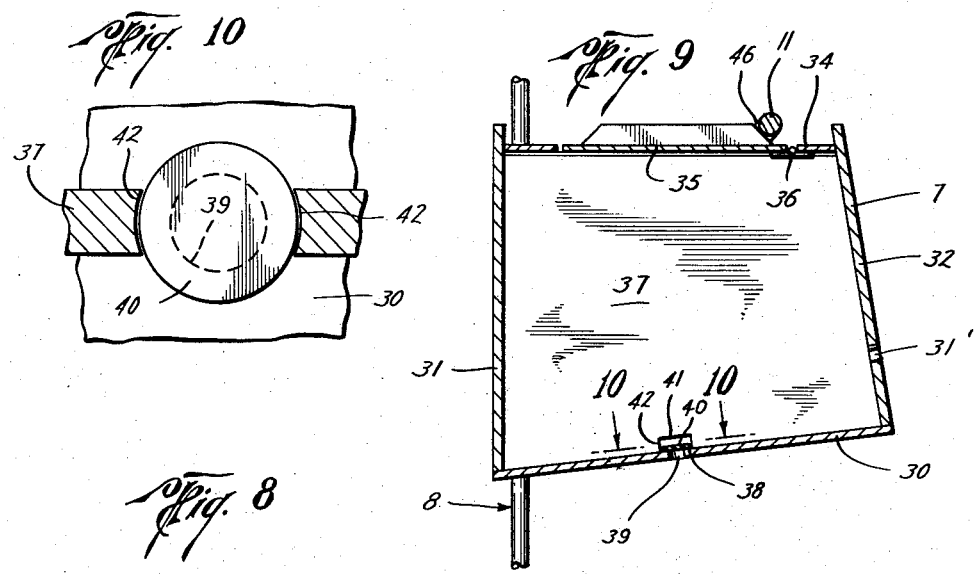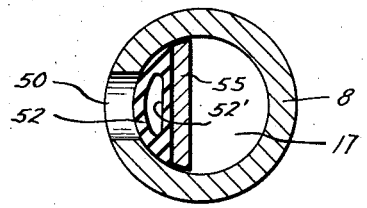

United States Patent Office 2,855,720
Patented Oct. 14, 1958

2,855,720

BAIT CONTAINER

George H. Allen, La Porte, Tex.

Application May 2, 1955, Serial No. 505,120

4 Claims. (Cl. 43—55)

The present invention relates to an arrangement for positioning a live bait container on the transom of a boat for supplying water thereto and for providing easy access to such container.

An object of the present invention is to provide a live bait container which is slidably mounted on the transom of a boat whereby water may be supplied thereto and which may be moved to any desired position relative to the transom for easy access thereto.

Still another object of the invention is to provide a live bait container arrangement including means adapted to be secured to the transom of a boat with the lower end of such means extending below the boat and directed forwardly, there being a passage extending along such means whereby water may be picked up by the lower end of such means when the boat is under-way and conducted through such passage, and a bait box supported on the means and having an opening communicating with the passage in the means whereby water may be conducted into the live bait box.

Still another object of the invention is to provide a pair of spaced hollow rods adapted to be secured to the transom of a boat upon which may be slidably arranged a bait box, the lower end of such rods being arranged to pick up water when the boat is under-way and to discharge it into the bait box.

Still another object of the invention is to provide a live bait box for slidably mounting on the transom of a boat whereby the box may be lowered into the water and may be positioned vertically along the transom at any desired position for access thereto, the bait box including side, bottom and end walls, a cover hinged on the top wall for closing the bait box, and means for normally maintaining the bait box cover closed to inhibit loss of bait from the box as it is lowered into the water.

Still another object of the invention is to provide a live bait box for slidably mounting on the transom of a boat whereby the box may be lowered into the water and may be positioned vertically along the transom at any desired position for access thereto, the bait box including side, bottom and end walls, a cover hinged on the top wall for closing the bait box, and valve means on the bait box whereby water may be flowed thereinto when it is lowered in the water and which valve means closes when the bait box is raised out of the water so as to trap the water in the bait box.

A still further object of the invention is to provide an arrangement adapted to be secured to a boat for picking up water when the boat is under-way and discharging it for use on the boat.

Another object is to provide means for easily replenishing the water in a bait box.

Still another object is to provide a means for aerating a bait container by continually supplying additional water to the bait container.

A still further object is to provide an arrangement adapted to be secured to a boat for picking up water when the boat is under-way, said arrangement including means with a passage therein extending from below the bottom of the boat upwardly along the transom thereof whereby water may be conducted through such means when the boat is under-way, there being an opening in such means communicating with the passage whereby the water picked up by such means may be discharged therefrom.

A still further object is to provide an arrangement adapted to be secured to a boat for picking up water when the boat is under-way, said arrangement including means with a passage therein extending from below the bottom of the boat upwardly along the transom thereof whereby water may be conducted through such means when the boat is under-way, there being an opening in such means communicating with the passage whereby the water picked up by such means may be discharged therefrom, and valve means for closing off communication between the discharge and the opening in such means to regulate the flow of water therebetween as desired.

Other objects and advantages of the invention will become more readily apparent from a consideration of the following description and drawings wherein:

Fig. 1 illustrates the preferred embodiment of the invention in side view as being mounted in position on the transom of a boat;

Fig. 2 is a sectional view on the line 2—2 of Fig. 1, illustrating in more detail the relationship between the water passage conducting means and the bait container;

Fig. 3 is a rear view of a boat showing the preferred embodiment of the invention, including spaced tubular members, with the bait box mounted thereon;

Fig. 4 is a top view looking down on Fig. 3;

Fig. 5 is a vertical, sectional enlarged view showing the preferred arrangement of the lower end of the water conducting means and the support bracket for the bait container;

Fig. 6 is a vertical sectional view partly in elevation showing the upper end of the water conducting means and the valve associated therewith for regulating communication between the passage in such means and the discharge opening in such means;

Fig. 7 is a view somewhat similar to Fig. 6, showing the valve moved to closed position;

Fig. 8 is a sectional view on the line 8—8 of Fig. 7 showing one form of detail of the valve means;

Fig. 9 is a vertical sectional view partly in elevation illustrating the bait box and valve means thereon for flowing water into the bait box as the bait box is lowered into the water;

Fig. 10 is a sectional view, partly in elevation, on the line 10—10 of Fig. 9, showing in further detail the arrangement of the valve means in the bait box.

In Fig. 1 a boat is illustrated at 3 with the transom thereof at 4 extending between the deck 5 and the bottom 6 of the boat. The bait box 7 is movably or slidably supported relative to the transom 4 of the boat 3 on suitable means such as that illustrated at 8, whereby the bait box 7 may be positioned vertically along the transom 4 at any desired position. To aid in such positioning, the rope 9 may be provided which is secured at 10 to the bail 11 pivotally connected at 12 to the bait box.

With such arrangement, the bait box may be lowered along the means 8 into the water until it rests on the bracket 13, which bracket is secured by any suitable means such as screws as illustrated at 14 to the transom 4.

As shown in Figs. 2, 3 and 4, the means 8 may be in the form of spaced tubular members 15 and 16 which are each provided with a passageway 17 therein. The tubular members 15 and 16 are connected to the transom 4 of the boat by any suitable braces as illustrated at 18. It is to be noted that the braces 18 space the means 8, which in the drawings are illustrated as being tubular members 15 and 16, from the transom a suitable distance so as to provide clearance whereby the bait container 7 may be raised and lowered along the transom. Also, it is to be noted that such brackets serve to mount the tubular members, or hollow rods 15 and 16 in a position substantially parallel to the transom of the boat as shown in Fig. 1 of the drawings. Any suitable number of the braces 18 may be used to securely position such members on the transom of the boat and four of such braces are shown in the drawings. In some circumstances, it may be desirable to use more or less depending upon the height of the transom.

The lower ends 20 and 21 of the tubular members 15 and 16 extend below the bottom 6 of the boat as illustrated in Figs. 1, 3 and 5, and it is to be noted that they are each directed forwardly so that as the boat moves through the water, water will be directed thereinto and thence to passage 17. In Fig. 5, a Venturi arrangement 22 is shown on the inner periphery of the members 15 and 16 at their lower ends 20 and 21 to aid in increasing the effectiveness of drawing water into the water conducting means 8 when the boat is moving through the water.

As shown in Fig. 2, the water conducting means 8, which are illustrated as being in the form of hollow rods 15 and 16 serve as a means for supporting the bait box 7 in position relative to the transom 4 and to this end, an opening 23 extends longitudinally of the bait box in blocks 24 at each side of the bait box so as to receive the rods or tubular members 15 and 16. A slot 25 communicates with the opening 23 and extends vertically of the box to provide a clearance passageway for the outwardly extending arm 26 of brace 18. The bait box 7 is provided with openings 27 therein which are adapted to communicate with openings 28 in each of the tubular members 15 and 16 so that as the boat moves through the water, water is picked up by the lower end of the tubular members, conducted through passage 17 and discharged through openings 28 into the bait box through openings 27 aligned therewith. Openings 28 may also be provided in other parts of rods 15 and 16 as desired. For example, they may be provided in the upper portion of rods 15 and 16 so that if the box is in the dotted line position shown in Fig. 1 while the boat is moving through the water, water may still be supplied to the bait box.

As shown in Fig. 9 of the drawings as well as in other views, the bait box 7 includes the bottom wall 30, the rear wall 31, the front wall 32, side walls 33 and a top 34. The top 34 is provided with an opening whereby the cover 35 may be secured thereover by suitable means such as the hinges 36 affixed to the cover and to the top 34. The side walls 33, as well as the front wall 32 of the bait box are provided with openings 31' extending therethrough for aeration of the bait box 7. It is to be noted that the cover 35 is secured to the top 34 and opens towards the boat which provides a means of ready access thereto when the bait box is in use. A partition 37 divides the bait box into two compartments as shown in the drawings.

When the bait box is first lowered into the water on the rods or members 15 and 16 by means of the rope 9, it is desirable to allow water to flow into the bait box so that the bait box will sink into the water and assume its proper position therein. To accomplish this function, suitable valve means as illustrated at 38 are provided; such valve means allows free movement of water through opening 39 in the bottom 30 and into the bait box 7 as it sinks in the water, but such valve means functions to close off the opening 39 when the bait box is raised out of the water so as to trap the water in the container.

The valve means 38 is illustrated in the drawings as being formed of a disc member 40 which is fitted in the recess 41 of partition 37. The recess 41 is provided with side walls 42 of a particular configuration which aids in maintaining the disc 40 in position during use of the device. Such disc may be of a plastic or rubber material which may be deformed to insert it in position within the recess 41 of partition 37, but which is sufficiently strong to return to its original shape after such insertion and maintain its shape over an extended period of use.

In using the invention, the braces 18 may be secured to the transom 4 by any suitable means such as screws or the like so as to position the tubular members 15 and 16 a suitable distance apart whereby the openings 23 in the rear of the bait box may slidably receive such rods. The support 13 may be secured by any suitable means such as screws 14 at a desired distance above the bottom of the boat so that when the bait container rests thereon, it will be submerged in the water to a desired depth. The lower ends 20 and 21 of the members 15 and 16 project below the bottom 6 of the boat and their upper ends 45 project a desired distance above the deck 5 of the boat. The bait container 7 may then be positioned on the rods 15 and 16 by engaging the openings 23 in such bait box with the rods, and the rope 9 may be used to lower the bait box into the water until it rests on support 13. As the bait box contacts the water, the disc or check valve 38 will move upwardly whereby water may flow into the bait container 7 through the opening 39 in the bottom 30 of the container. In order to keep the cover 35 closed while the boat is moving through the water, the bail 11 is pivotally connected at 12 to the bait container 7 so that the rope 9 may move it to a wedging fit on the top 35 as shown at 46 in Figs. 1 and 9.

When the boat is standing still and the bait box is in the lowermost position as illustrated in Fig. 1, the holes 31' are below the water level so that water may flow into and out of the bait box.

As the boat moves through the water, water is conducted through the pasage 17 of each members 15 and 16 so that it may be discharged through the openings 28 therein into the bait container 7. Overflow is discharged from the box through openings 31' whereby the water in the bait box is easily and continually replenished for aeration of the bait. When the boat has arrived at the destination where the bait box is to be used, it may be raised out of the water by means of the rope 9. As it is moved out of the water, the check or disc valve 38 moves to close opening 39 so as to trap some of the water in the bait container.

The container may then be moved upwardly along the rods 15 and 16 to the position illustrated in dotted line in Fig. 1 and the bail 11 may be hooked over the upper ends 45 of each of the tubular members 15 and 16 to retain the container in position.

From the foregoing description it can be appreciated that an arrangement is provided whereby water may be circulated to the bait container while the boat is underway so as to keep the bait alive. Also, the bail 11 serves to maintain the cover 35 of the bait box 7 closed during travel of the boat through the water so that loss of bait from the container will be inhibited.

In some situations, it may be desirable to use the water conducting means 8 for furnishing water to wash off the boat as it is returning to its dock.

In such event, an opening 50 could be provided adjacent the upper end of the tubular members 15 and 16 which opening communicates with the passage 17 in such members. A valve 51 is provided with a sealing element 52 so that upon rotation of such valve, it cuts off communication between the opening 50 and the passage 17 as illustrated in Fig. 7 of the drawings.

Valve means 51 includes the upwardly extending member 53 which has the portion 54 depending therefrom. The portion 54 is adapted to telescopically fit within the passage 17 as shown in each of Figs. 6 and 7. A retainer 55 is provided for the sealing element 52, which element fits within the recess 56 of the retainer 55 and lower part of the depending portion 54.

The sealing element 52 may be formed of resilient material such as rubber, and while such member may be of any suitable configuration to accomplish its function, a preferred embodiment is shown in the drawings.

Such embodiment comprises a sealing element 52 which is formed of tubular material having the opening 52' therein as better seen in Fig. 8. The element 52 is shorter than the recess 56 as shown in Figs. 6 and 7 whereby water from the passage 17 may flow past the lower end of retainer 55, through passage 55' formed by the clearance of element 52 and recess 56 and into opening 52' to urge the sealing element 52 into sealing position against opening 50.

In order to inhibit loss of water around the valve and to provide a means for releasable maintaining the valve in position in the members 15 and 16, an annular V-shaped groove 57 is provided on the inner periphery of the passage 17. A cooperating groove 59 is provided on the outer periphery of the depending portion 54 of the valve 51 in which groove is mounted the O-ring 58. The groove 59 is formed by the tapering side wall 59a and the substantially vertical wall 59b which intersect. Thus, when the valve 51 is inserted into the passage 17 of each of the tubular members, the O-ring is moved into the cooperating grooves 57 and 59 and it is necessary, in order to remove the valve 51 to exert more than an ordinary amount of pulling effort thereon.

In order that the water discharged from passage 17 may be utilized, a housing 60 may be slidably fitted over the water conducting means 8 so that the O-rings 61 and 62 therein span the opening 50. An outlet 63 in such housing communicates with the opening 50 and is adapted to receive the hose 64 on the end thereof whereby water may be discharged through the hose for use on the boat.

It is necessary to wash a boat down after use and the present invention provides a water conducting means which discharges water through a hose for use in washing down the boat as it is returning to dock.

It seems obvious from the foregoing description that modifications in design could be made without departing from the scope of the invention. The drawings illustrate the preferred embodiment and it is not intended that the invention be limited to such embodiment.

Broadly the invention relates to a bait box arrangement and a water conducting means which may be secured to a boat for conducting water for use on the boat when the boat is under-way.

What is claimed is:

1. A device for securing to a boat for holding live bait and the like comprising, a pair of hollow rods adapted to be secured to the boat and extending therebelow, a bait box slidably mounted on said rods, there being openings in said rods and box whereby water may be conveyed to said box through said rods as the boat moves through the water.

2. A device for securing to a boat for holding live bait and the like comprising, a bait box, means adapted to be secured to the transom of a boat for supporting said box and for conducting water thereto, said means including spaced hollow rods extending substantially parallel to the transom with their lower ends projecting below the bottom of the boat and directed forwardly so as to pick up water when the boat is under way to conduct it to said box.

3. A live bait box arrangement for mounting on the transom of a boat comprising, tubular means secured to the transom of a boat with the lower end thereof projecting below the boat and the upper end terminating adjacent the deck of the boat, a bait box slidably mounted on said tubular means whereby said bait box may be positioned at any desired position therealong, said tubular means having openings therein for discharge of water picked up by such means when the boat is under way, and said bait box having openings therein for receiving water from the openings in the tubular means.

4. A live bait box arrangement for mounting on the transom of a boat comprising, tubular means secured to the transom of a boat with the lower end thereof projecting below the boat and the upper end terminating adjacent the deck of the boat, a bait box slidably mounted on said tubular means whereby said bait box may be positioned at any desired position therealong, said tubular means having openings therein for discharge of water picked up by such means when the boat is under way, said bait box having openings therein for receiving water from the openings in the tubular means, and valve means in said bait box for ingress of water thereto as said bait box is lovered on said means into the water, said valve means acting to close when said box is raised on said tubular means whereby egress of water through said valve means is prevented.

References Cited in the file of this patent

UNITED STATES PATENTS

| 1,801,117 | Smith | Apr. 14, 1931 |
| 2,151,225 | Newton | Mar. 21, 1939 |
| 2,564,598 | Grimshaw | Aug. 14, 1951 |
| 2,721,718 | Wagner | Oct. 25, 1955 |

FOREIGN PATENTS

| 68,398 | Sweden | May 11, 1928 |
| 536,068 | France | Feb. 6, 1922 |